UNITED STATES PATENT OFFICE.

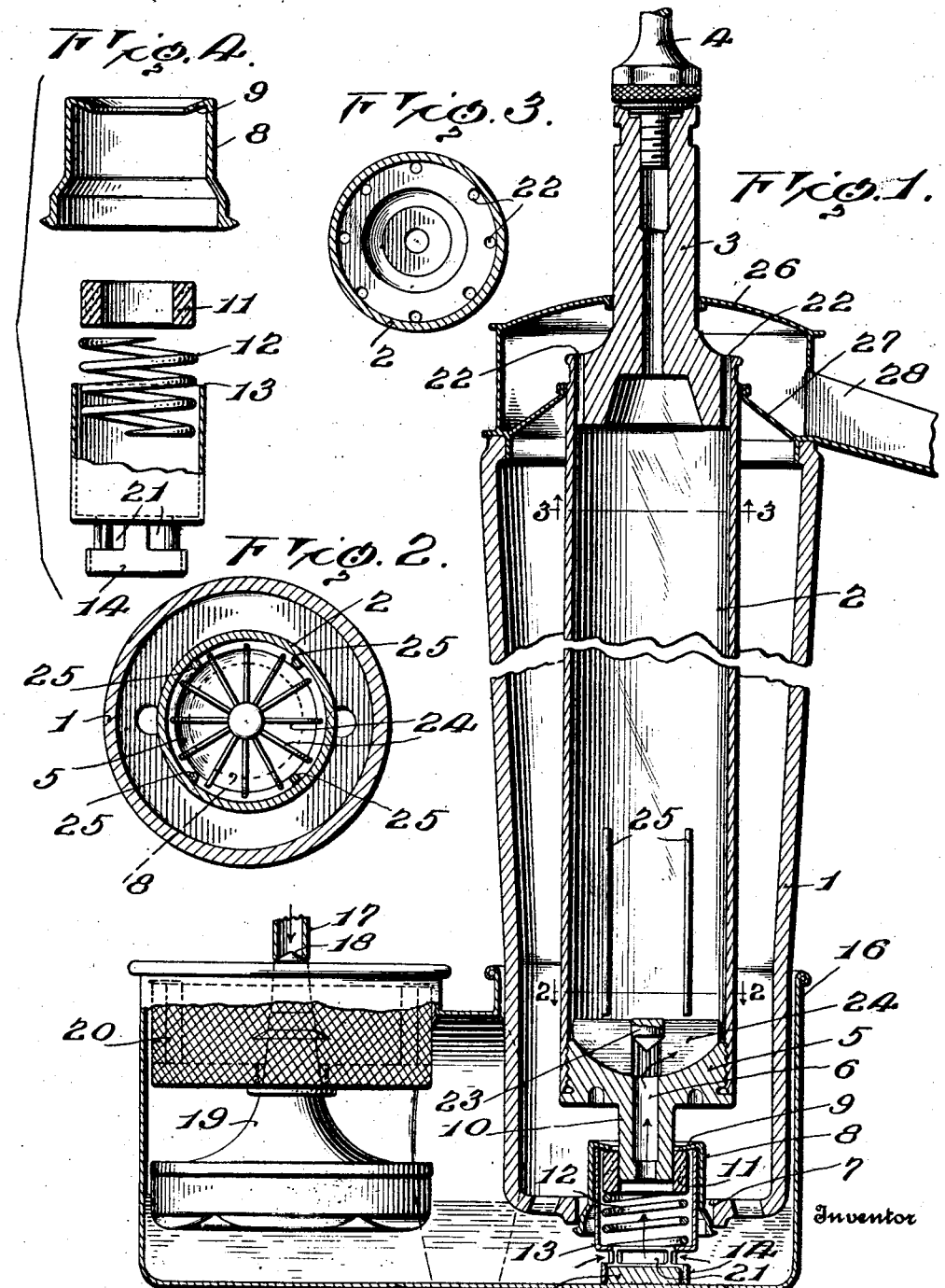

WALTER GRANT DIXON, OF WEST CHESTER, PENNSYLVANIA, ASSIGNOR TO THE SHARPLES SEPARATOR CO., OF WEST CHESTER, PENNSYLVANIA, A CORPORATION OF PENNSYLVANIA.

EMULSIFIER.

1,382,765.  Specification of Letters Patent.  Patented June 28, 1921.

Original application filed January 3, 1920, Serial No. 349,301. Divided and this application filed August 4, 1920. Serial No. 401,261.

*To all whom it may concern:*

Be it known that I, WALTER GRANT DIXON, a citizen of the United States, residing at West Chester, in the county of Chester, State of Pennsylvania, have invented certain new and useful Improvements in Emulsifiers, of which the following is a description, reference being had to the accompanying drawing and to the figures of reference marked thereon.

The invention relates to new and useful improvements in emulsifiers, and more particularly to an emulsifier wherein the material is largely emulsified by impact of material upon material against a rapidly rotating vertical wall.

An object of the invention is to provide an emulsifier of the above character wherein the emulsifying bowl is cylindrical and of relatively small diameter whereby it may be rotated at a very high speed and the emulsifying impact force thereby greatly intensified.

A further object of the invention is to provide an emulsifier of the above character wherein the material is taken into the rapidly rotating emulsifying bowl centrally at the bottom portion thereof, divided into a plurality of relatively small streams and caused to rotate with the bowl so as to be thrown by centrifugal force against the rotating vertical wall of the emulsifying bowl.

A still further object of the invention is to provide an emulsifier of the above character wherein the outlet opening or openings from the emulsifying bowl are located at a distance from the lower end of the bowl so that, as the material through the action of centrifugal force thereon flows upwardly along the inner vertical wall of the bowl, will be clarified.

Another object of the invention is to provide an emulsifier of the above character wherein the inlet and outlet openings are so proportioned that the material is fed into the rotating emulsifying bowl by suction which varies according to the speed of rotation of the emulsifying bowl and thereby the feed is regulated in accordance with the speed of rotation of the bowl.

These and other objects will in part be obvious and will in part be hereinafter more fully described.

In the drawings:—

Figure 1 is a vertical sectional view through a portion of an emulsifier having my improvements embodied therein;

Fig. 2 is a sectional view on the line 2—2 of Fig. 1, looking downwardly;

Fig. 3 is a sectional view on the line 3—3 of Fig. 1, looking upwardly.

Fig. 4 is a view, partly in vertical section and partly in side elevation, showing the centering means at the lower end of the bowl.

The invention is directed broadly to an emulsifier which consists of a cylindrical bowl of relatively small diameter which is suspended and rotated very rapidly. The bowl rotates in an outer casing, which is provided with yielding means for centering the lower end of the bowl so that the bowl will rotate very smoothly about a vertical axis. The cylinder forming the bowl of the emulsifier is closed at its bottom by a suitable bottom plate, which is provided with a central opening through which the material is fed into the bowl. Adjacent said opening are partitions and a spreader for dividing the incoming stream into a number of fine or small streams and for causing said divided streams to rotate with the bowl so that these streams will be thrown by centrifugal force against the inner vertical wall of the rotating bowl. The upper end of the rotating bowl is closed by a head, preferably formed integral with the cylindrical body portion of the bowl and through which said bowl is suspended and rotated. Extending through said head are delivering openings which are substantially in line with the inner wall of the bowl and of such capacity to permit the material passing by centrifugal force upwardly along the inner wall of the bowl to escape. These openings, being in line with the inner wall of the bowl, will cause only a thin film of the material to remain flowing upwardly along the inner wall of the bowl which escapes through these discharge openings in the form of a fine mist or fog.

Referring more in detail to the drawings, I have shown my improved emulsifier as consisting of an outer casing 1 which may be mounted upon a suitable supporting bracket. Suspended within the outer casing and entirely free thereof is my improved emulsifying bowl 2 which is in the form of a cylinder. This cylinder is relatively small in diameter and may, therefore, be rotated very rapidly, from sixteen thousand to twenty thousand R. P. M., depending upon the size of the machine.

Projecting upwardly from the upper end of the cylinder is a supporting head 3 which may be formed integral with the cylinder forming the bowl, and this supporting head is carried by a spindle 4 which is rotated by suitable means. The head 3 may be disconnected from the rotating spindle and the bowl removed.

The lower end of the cylindrical bowl 2 is closed by a removable plate or plug 5 which is threaded into the lower end of the bowl, and suitable means may be provided for forming a tight joint connection between this plate and the bowl proper. Said plug or plate 5 is provided with an inlet opening 6. The casing 1 is formed with an opening 7 in which is placed a ferrule 8. The upper end of said ferrule is turned inwardly to form a flange 9. The central opening through the flange 9 is slightly larger than the projecting end 10, of the plate 5. Located within the ferrule 7 is a lead collar 11 which is adapted to fit loosely the projecting end 10. A spring 12 bears against the collar 11 at its upper end, and at its lower end against a housing 13. The housing 13 is provided with an extension 14 fitting a cylindrical lug 15 carried by the receptacle 16. This receptacle 16 is adapted to engage the lower end of the casing 1 and may be suitably secured thereto. The collar 11 is forced by means of the spring against the flange 9. The diameter of this collar 11 is less than the inner diameter of the housing 13. As a result, when the bowl is rapidly rotated, this collar is yieldingly held against the flange and may shift laterally to permit the lower end of the bowl to center itself so that said bowl may rotate smoothly about a vertical axis.

The material, which is to be emulsified, is thoroughly mixed and melted in a suitable mixing apparatus, such as shown, for example, in my copending application Serial No. 349,301, filed January 3, 1920, of which the present application is a division. From this mixing tank, the material is led through a pipe 17 into the receptacle 16. A valve 18 carried by a float 19 fits the lower end of the pipe 17 and determines the level of the liquid ingredients in the receptacle 16. A strainer 20 may be used for guiding the float and for straining the liquid as it passes into the receptacle 16. The housing 13 is provided with openings 21 so that the material may pass into the housing and up to the level at least of the lower edge of the collar 11.

The head 3 is provided with suitable openings 22 distributed about the outer circumference of the head, and these openings are in line with the inner wall of the bowl 2. These openings are of sufficient size so as to cause the material to enter the bowl through the inlet opening 6 by suction. As the cylinder rotates, the air therein is forced out through the openings 22, creating a vacuum within the bowl, and this causes the material to enter by suction. The suction force which causes the material to enter the bowl will, of course, be dependent upon the comparative size of the inlet and outlet openings. This force will also vary with the speed of the bowl. The capacity of the bowl in the feed of the emulsified liquid therethrough likewise varies with the speed, and by my improved suction feed I am able to automatically supply the material just as fast as it will be efficiently emulsified and delivered from the bowl. If the speed of the bowl decreases, the feed decreases, and, on the other hand, when the speed of the bowl increases the feed increases.

As soon as the material passes from the inlet 6 into the lower part of the bowl, it is directed laterally by means of a spreader 23. Extending about the inlet opening 6 are radial partitions 24, see Fig. 2. These partitions may be of any desired number but are preferably of sufficient number to divide the incoming stream into a number of relatively small streams and direct these streams outwardly against the vertical wall of the emulsifier. The incoming material is not only divided into a plurality of streams, but these streams are rotated at the same speed as the bowl and will be caused thereby to flow outwardly with great force, striking against the vertical wall of the rapidly rotating bowl. By making the bowl relatively small in diameter, it may be rotated at the very rapid speed above mentioned and a centrifugal force of substantially seventy-five pounds per square inch produced. In effect, a globule of the material strikes the vertical wall with this tremendous force, then another globule strikes against the first globule, and so on, so that the material is impacted upon the material and against this vertical wall. The material then creeps up the vertical wall in a thin film. The ribs 25 aid in the directing of the material upwardly along the inner wall of the bowl.

The material escapes through the openings 22 which are sufficiently large to permit free flow of the material, and as the material escapes it is in the form of a fine mist or fog, which is thrown against the cover 26, collected by the cone-shaped bottom plate 27 and directed into a trough 28.

My improved emulsifier is particularly adapted for emulsifying fats and oils, sweetenings, such as sugar and molasses, salt and the like, and in the emulsifying of such ingredients small solid mineral particles are often not dissolved and sometimes other foreign substances. The centrifugal force is at right angles to the vertical wall along which the film of material passes, and this centrifugal force acting on the solid particles will cause them to adhere to the vertical wall and thus be separated from the flowing film of emulsified liquid and thereby the emulsified liquid is clarified. After the running of a batch of material the bowl is removed and this foreign substance separated from the liquid is removed.

The emulsification of the ingredients occurs in a large degree at the lower end of the bowl, and from certain aspects of the invention the bowl may be relatively short. I prefer, however, a relatively long bowl, as this enables the clarifying action to take place. The passing of the material along the vertical wall of the bowl, where it is subjected to the intense centrifugal force thereon, aids in further emulsifying the ingredients and likewise, as the ingredients are discharged from the openings 22 they strike against the cover with more or less force and again the emulsifying is further carried on. By making the openings 22 sufficiently large so as not to restrict the free flow of the stream of emulsified fluid, the efficiency of the machine is very much increased. Where these openings are small and the emulsification is accomplished by forcing the ingredients through restricted openings, the machine frequently becomes clogged or dammed and cleaning is required.

It is obvious that changes in the details of construction, the shaping of the parts and the proportions of the parts may be made without departing from the spirit of the invention as set forth in the appended claims.

Having thus described the invention, what is claimed as new is:—

1. An emulsifier including in combination a rotating closed bowl having an inlet opening located at a distance from the inner wall of the bowl, and discharge openings disposed relative to the bowl and proportioned relative to the inlet opening so as to cause the material to enter the inlet opening by suction and to be thrown against the inner wall of the bowl for emulsifying the same.

2. An emulsifier including in combination a rotating closed bowl having an inlet opening located at a distance from the inner wall of the bowl, and discharge openings disposed relative to the bowl and proportioned relative to the inlet intake opening so as to cause the material to enter the inlet opening by suction and to be thrown against the inner wall of the bowl for emulsifying the same, said rotating bowl having a vertical wall between its inlet opening and discharge openings along which the material is caused to flow for clarifying the same.

3. An emulsifier including in combination a rotating closed bowl having an inlet opening centrally of its lower end, and discharge openings at its upper end, said discharge openings being so disposed relative to the inner surface of the wall of the bowl and so proportioned relative to the inlet opening as to cause the material to enter the rotating bowl by suction and to be thrown against the wall of the bowl for emulsifying the same.

4. An emulsifier including in combination a rotating closed bowl having an inlet opening centrally of its lower end, and discharge openings at its upper end, said discharge openings being so disposed relative to the inner surface of the wall of the bowl and so proportioned relative to the inlet opening as to cause the material to enter the rotating bowl by suction and to be thrown against the wall of the bowl for emulsifying the same, said rotating bowl having radial partitions at the lower portion thereof adjacent said inlet opening for dividing the incoming stream into a plurality of small streams, and for rotating said small streams with the bowl.

5. An emulsifier including in combination, a vertically disposed rotating cylindrical bowl having discharge openings at its upper end substantially in line with the inner wall of said bowl, said bowl having an inlet opening at the bottom end thereof disposed so that the material entering therethrough will be impacted against the inner vertical wall of the bowl.

6. An emulsifier including in combination, a vertically disposed rotating cylindrical bowl having discharge openings at its upper end substantially in line with the inner wall of said bowl, said bowl having an inlet opening at the bottom end thereof disposed so that the material entering therethrough will be impacted against the inner vertical wall of the bowl, said openings at the top of the bowl being of sufficient size to cause the material to enter the bowl by suction.

7. An emulsifier including in combination, a vertically disposed rotating cylindrical bowl having discharge openings at its upper end substantially in line with the inner wall of said bowl, said bowl having an inlet opening at the bottom end thereof disposed so that the material entering therethrough will be impacted against the inner vertical wall of the bowl, said openings at the top of the bowl being of sufficient size to cause the material to enter the bowl by suction and to provide a free discharge of the material from the bowl in a fine fog or mist.

8. An emulsifier including in combination, a vertically disposed rotating cylindrical bowl having openings at the upper end thereof substantially in line with the inner wall of said bowl, said bowl having an inlet opening centrally at the bottom thereof, radial partitions disposed about the said inlet opening for dividing the incoming stream into a plurality of small streams, rotating the same with the bowl and impacting said streams against the vertical wall of the bowl.

9. An emulsifier including in combination, a vertically disposed rotating cylindrical bowl having openings at the upper end thereof substantially in line with the inner wall of said bowl, said bowl having an inlet opening centrally at the bottom thereof, radial partitions disposed about the inlet opening for dividing the incoming stream into a plurality of streams, rotating the same with the bowl and impacting said streams against the vertical wall of the bowl, and vertically disposed ribs carried by the inner surface of the bowl above said radial partitions.

10. An emulsifier including in combination, a vertically disposed rotating cylindrical bowl having openings at the upper end thereof substantially in line with the inner wall of said bowl, said bowl having an inlet opening centrally at the bottom thereof, radial partitions disposed about said inlet opening for dividing the incoming stream into a plurality of small streams, rotating the same with the bowl and impacting said streams against the vertical wall of the bowl, and a cone-shaped spreader located in line with the inlet opening and below the face of said radial partitions for directing the incoming stream between the partitions.

11. An emulsifier including in combination, a vertically disposed rotating cylindrical bowl having openings at the upper end thereof substantially in line with the inner wall of said bowl, said bowl having an inlet opening centrally at the bottom thereof, radial partitions disposed about said inlet opening for dividing the incoming stream into a plurality of small streams, rotating the same with the bowl, and impacting said streams against the vertical wall of the bowl, said discharge openings being disposed at a distance from said inlet opening whereby the emulsified material is caused to travel a distance along the vertical wall so that the solid particles may be separated from the emulsified liquid by adhering to the vertical wall.

12. A centrifugal emulsifier comprising a revoluble bowl having an axial inlet, means adjacent to said inlet for throwing constituents introduced therethrough directly against the bowl wall, and a bowl outlet or outlets whereby a film of said constituents is carried through said bowl and discharged through said outlet or outlets.

13. A centrifugal emulsifier comprising a revoluble vertical bowl having an axial bottom inlet, means adjacent to said inlet for spreading and revolving a liquid introduced therethrough, and a plurality of top outlets adapted for regulating the liquid to film in flowing upwardly along said bowl.

In testimony whereof, I affix my signature.

WALTER GRANT DIXON.